(12) United States Patent
Kimura et al.

(10) Patent No.: US 7,933,188 B2
(45) Date of Patent: Apr. 26, 2011

(54) OPTICAL PICKUP

(75) Inventors: Shigeharu Kimura, Totsuka (JP);
Tatsuro Ide, Kawasaki (JP); Koichi Watanabe, Hachioji (JP)

(73) Assignee: Hitachi Media Electronics Co., Ltd., Iwate-Ken (JP)

( * ) Notice: Subject to any disclaimer, the term of this patent is extended or adjusted under 35 U.S.C. 154(b) by 586 days.

(21) Appl. No.: 12/025,799

(22) Filed: Feb. 5, 2008

(65) Prior Publication Data
US 2009/0103106 A1    Apr. 23, 2009

(30) Foreign Application Priority Data
Oct. 22, 2007 (JP) ................. 2007-273947

(51) Int. Cl.
*G11B 7/00* (2006.01)
(52) U.S. Cl. .............. 369/112.01; 369/112.03
(58) Field of Classification Search ............... 369/44.32, 369/47.1, 53.22, 94, 53.1, 112.1, 112.01, 369/112.03, 112.04, 112.05, 112.07, 112.15, 369/44.23, 44.24
See application file for complete search history.

(56) References Cited

U.S. PATENT DOCUMENTS
6,956,807 B2 * 10/2005 De Vries et al. ......... 369/112.06
2009/0168628 A1    7/2009 Nishimoto et al.

FOREIGN PATENT DOCUMENTS
JP    2002-367211    12/2002
JP    2005-302084    10/2005
JP    2007-233283    9/2007

OTHER PUBLICATIONS

H. Richter, et al., "System Aspects of Dual-Layer Phase-Change Recording with high Numerical Aperture Optics and Blue Laser", Jpn. J. Appl. Phys. vol. 42 (Feb. 2003) pp. 956 to 960.

* cited by examiner

*Primary Examiner* — Nabil Z Hindi
(74) *Attorney, Agent, or Firm* — Antonelli, Terry, Stout & Kraus, LLP.

(57) ABSTRACT

To reduce a bad influence on a tracking control signal and a data signal by reflected light from an adjacent layer on a multi-layer disc as stray light, the following device is made in the invention. Reflected light from the multi-layer optical disc including stray light from another layer is once converged by a reflected light condenser lens and is reflected on a reflector. A grating which prevents zero-order light from being generated by setting groove depth to $\lambda/4$ and which is set to pitch to prevent positive and negative first- or higher-order diffracted lights from returning to the reflected light condenser lens is arranged between the lens and the reflector including an optical axis with the grating apart from the reflector. Hereby, as reflected light from another layer is cut off though reflected light from a corresponding layer is transmitted to a detector, a detected control signal and a detected data signal are not influenced by reflected light from another layer.

10 Claims, 15 Drawing Sheets

OPTICAL PICKUP

CLAIM OF PRIORITY

The present application claims priority from Japanese application JP 2007-273947 filed on Oct. 22, 2007, the content of which is hereby incorporated by reference into this application.

FIELD OF THE INVENTION

The present invention relates to an optical pickup, particularly relates to a reading optical system of the optical pickup.

BACKGROUND OF THE INVENTION

The storage capacity of one layer of an optical disc greatly depends upon a wavelength of a used semiconductor laser and a numerical aperture (NA) of an objective lens. The shorter the wavelength of the semiconductor laser is or the larger NA is, the larger the recording density can be and the capacity per one layer can be increased. The mainstream of optical disc drives currently distributed on the market is a digital versatile disc (DVD) drive using red light having a wavelength in the vicinity of 650 nm and an objective lens the NA of which is 0.6; however, as a drive the recording density of which exceeds the recording density of the DVD drive, an optical disc drive using a semiconductor laser that emits a violet beam having a wavelength in the vicinity of 405 nm for a light source and an objective lens the NA of which is 0.85 is also shipped. For a method of further increasing currently achieved recording density, the reduction of a used wavelength is conceivable; however, it is estimated that the development of a semiconductor laser that emits a beam in an ultraviolet region the wavelength of which is shorter than that of the violet beam is difficult. Besides, as for enhancing NA of an objective lens, as a limit of the NA of the objective lens in air is 1, the enhancement depending upon the NA of the objective lens of recording density has been also difficult.

In such a situation, for a method of increasing the capacity of one optical disc, two-layer structure is adopted. On Jpn. J. Appl. Phys. Vol. 42 (2003) pp. 956 to 960, the technology of a two-layer phase change disc is described. When a laser beam is radiated onto a two-layer optical disc, it simultaneously irradiates adjacent layers and therefore, layer-to-layer crosstalk comes into question. To reduce this problem, layer-to-layer spacing is increased. As a laser beam is focused and a layer except a target layer (a corresponding layer) is off a focused spot of the layer beam, crosstalk can be reduced.

In the meantime, when layer-to-layer spacing is widened, spherical aberration comes into question. Recording layers are buried in polycarbonate the refractive index of which is different from that of air and the spherical aberrations are different depending upon depth from the surface of the disc. An objective lens is designed so that the spherical aberrations are small for the specific layers and as distance from the surface is different between focal spots when a focus of the laser beam is shifted on another layer, spherical aberration occurs. This aberration can be corrected by locating an expanding lens optical system normally including two lenses or a liquid crystal element in front of the objective lens. That is, the aberration can be corrected by changing distance between the two lenses or a phase of the liquid crystal element. However, when it is considered that a compensable range of the liquid crystal element or a mechanism for moving the lens is provided in a small-sized optical disc drive, it is difficult to correct large spherical aberration. Therefore, the thickness of the whole multi-layer disc is limited and layer-to-layer spacing is made narrow in a multi-layer optical disc having multiple layers. Therefore, in an actual optical disc drive, layer-to-layer crosstalk is left unsolved.

To reduce the crosstalk, in JP-A No. 2005-302084, it is utilized that focused spots of reflected lights from a target layer and an adjacent layer are different on an optical axis when reflected light from a multi-layer optical disc is focused by a lens. Only the target reflected light can be extracted by arranging a minute mirror on the optical axis and crosstalk can be reduced. However, as a method of bending the reflected light from the optical disc in a lateral direction of the optical axis is adopted, an optical pickup is necessarily large-sized. Besides, in JP-A No. 2002-367211, a method of removing reflected light from an adjacent layer using a critical angle prism is proposed. In this method, light at an angle equal to or exceeding a certain angle with an optical axis is removed by the critical angle prism utilizing a fact that reflected light from the adjacent layer is turned divergent light or convergent light though reflected light from a corresponding layer is turned collimated light. In this method as two critical angle prisms are used, an optical pickup is also large-sized.

SUMMARY OF THE INVENTION

Referring to FIG. 3, crosstalk by a multi-layer optical disc in a detecting optical system of an optical pickup will be described below. In this case, for a method of detecting a tracking error signal, differential push-pull (DPP) shall be used. In DPP, a laser beam is split into one main beam and two subbeams by a diffraction grating and the three beams irradiate the optical disc. FIG. 3 shows only the main beam 80. For simplification, a reference numeral 501 denotes a two-layer optical disc, and 511 and 512 denote an information recording layer. A minimum beam spot of the main beam from an objective lens 401 is located on the information recording layer 511 as shown by the main beam 80 and information is about to be read from the information recording layer 511. Guide grooves for tracking shown in FIG. 4 are formed on the information recording layer 511, the main beam irradiates the groove as a beam spot 94, and simultaneously, the subbeams irradiate positions off by half track pitch as irradiation spots 95, 96. As the irradiating beam is focused on the recording layer 511, its reflected light follows the same optical path as the incident beam in a reverse direction and returns to the objective lens 401 shown in FIG. 3. Next, the reflected light is transmitted in a detecting lens 402 to be a light beam 801 and is incident on a photodetector 51. The detecting lens 402 includes astigmatism and the photodetector 51 is installed in a position of a minimum circle of confusion. FIG. 5 shows shapes of photodetectors and incident states of reflected lights from the disc. The four-piece photodetector 541 located in the center detects the main beam and the main beam irradiates the photodetector 541 in a spot 811. Reflected lights by the subbeams are incident on the two-piece photodetectors 542, 543 in light spots 812, 813. Signals from the four-piece photodetector 541 shall be A, B, C, D, signals from the two-piece photodetector 542 shall be E, F, and signals from the two-piece photodetector 543 shall be G, H. At this time, a tracking error signal TR is expressed as $TR=(A+B)-(C+D)-k\{(E-F)+(G-H)\}$. In this case, "k" denotes a constant and the constant is determined based upon the intensity ratio of the main beam to the subbeam and others. Normally, the intensity of the main beam is set 10 or more times than the intensity of the subbeam. When a focus error signal is AF and a data signal is RF, $AF=A+C-(B+D)$ and RF=A+C+B+D. The TR and AF signals are used for control over positions which the laser beam irradiates.

Such design that when the laser beam irradiates the multi-layer disc, the quantity of reflected light from each layer is substantially equal is made. Therefore, the transmissivity of the layer close to the objective lens is made larger and the laser beam can also irradiate the layer apart from the objective lens. When the laser beam is focused on the target layer 511 for reading information as shown in FIG. 3 on such a condition, a part of the laser beam is transmitted in the corresponding layer 511 as a light beam 82 and is reflected on the adjacent layer 512 to be a reflected light beam 83 which is stray light. After the reflected light beam 83 returns to the objective lens 401 and is incident on the detecting lens 402, it is once converged in front of the photodetector 51 and is incident on the photodetector 51, diverging as shown as a light beam 804. The light beam 804 is turned a divergent beam spot 841 on the photodetector as shown in FIG. 5 and the divergent beam spot covers the photodetectors 541, 542, 543. Therefore, the beam spot interferes with the beams 811 and 812, 813. This interference is influenced and varies by a change of the phase of the beam spot 841 by the variation of layer-to-layer spacing.

The variation of the intensity of the RF signal which is the whole quantity of the beam 811 causes the deterioration of jitter in the RF signal and deteriorates an error rate in reading data. Interference with the beams 812, 813 causes the variation of the TR signal. As the intensity of the subbeams generated by being split by a diffraction grating is set to a small value in design, the intensity is similar to the power density of the reflected light of the main beam from the adjacent layer and therefore, the effect of the interference is intensified. This interference is also influenced by the gradient and the layer-to-layer spacing of the optical disc and the intensity distribution in the beam spot 812 or 813 varies by the rotation of the disc having uneven layer-to-layer spacing. As a result, a part of a differential signal (E-F)+(G-H) of the TR signal is influenced and a tracking signal is unbalanced. Hereby, a problem that tracking is disabled occurs. Similarly, when the adjacent layer 512 is located on the side close to the objective lens of the target reading layer 511, reflected light is also caused from the adjacent layer and problematic interference is similarly caused.

An object of the invention is to reduce crosstalk to a data signal and a tracking signal caused from another layer when data stored on a multi-layer optical disc is read by an optical pickup.

A method of reducing the effect of reflection from another layer is used for addressing the above-mentioned problem.

The optical pickup according to the invention is provided with a laser beam source, an irradiating beam focusing optical system that focuses a laser beam from the laser beam source on one recording layer of a multi-layer optical information storage medium and a detecting optical system that detects reflected light reflected from the recording layer of the multi-layer optical information storage medium. The detecting optical system includes a reflected light condenser lens that converges reflected light from the recording layer, a reflecting plane located in a minimum spot position of reflected light from the target recording layer out of the reflected light converged by the reflected light condenser lens, a grating which is installed between the reflected light condenser lens and the reflecting plane and which attenuates reflected light from another layer except the corresponding layer or prevents the reflected light from another layer from returning to the reflected light condenser lens and a photodetector that detects the reflected light, and the reflected light reflected on the reflecting plane is detected on the photodetector.

The grating is overlapped with at least one of minimum spot positions by the reflected light condenser lens of the reflected light from another layer and is provided with the grating including an optical axis and with a direction of its grooves perpendicular to the optical axis or with the grating inclined from the optical axis. The grating plays a role of preventing reflected light from another layer from returning to the reflected light condenser lens.

According to the invention, only reflected light from the corresponding layer can be extracted and when the reflected light is detected by the photodetector, the effect of reflected light from an adjacent layer can be reduced. Hereby, the jitter of a data signal can be reduced and the reliability of read data is enhanced. When three beams are used, the quantity of reflected light from the adjacent layer incident on a subbeam detector can be reduced and the variation by interference of a tracking error signal can be reduced. Hereby, when data stored on an optical disc is read or data is written to the optical disc, a light spot never deviates from a track.

DETAILED DESCRIPTION OF THE PREFERRED EMBODIMENTS

Figure 6:
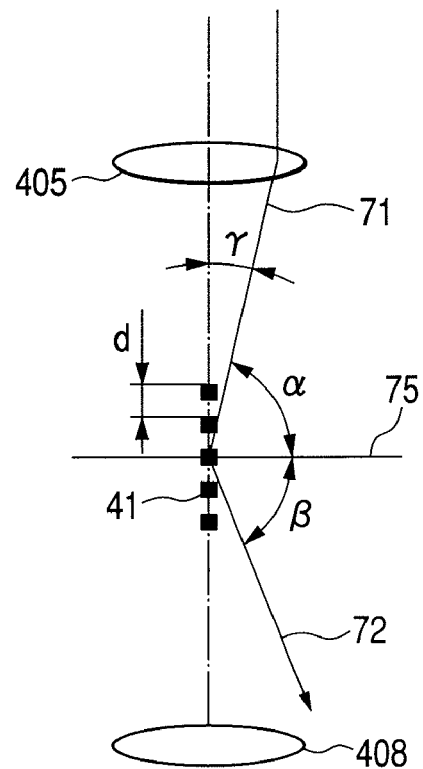
FIG. 6 illustrates reflection and diffraction by a grating installed on an optical axis of two lenses.

Referring to FIG. 6, a role of a grating will be described below. In the grating, grooves are arranged at a fixed cycle only in one direction. In FIG. 6, an optical grating 41 having the pitch of d is installed on an optical axis of a reflected light condenser lens 405 and grooves of the grating are perpendicular to a paper face. A perpendicular 75 perpendicular to a surface of the grating is parallel with the paper face. Incident light 71 is incident on the grating via the reflected light condenser lens 405 at an angle of $\gamma$ with the optical axis and simultaneously, perpendicularly to a direction of the grooves of the grating. An angle of incidence with the perpendicular 75 shall be $\alpha$ (=90−$\gamma$). In this case, the grating 41 is a reflector type and certain-order reflected diffracted light 72 shall be outgoing at an angle of reflection of $\beta$. The detection of diffracted light will be described using a transmission method below; however, a case that a reflector is installed in a position equivalent to focal distance of the condenser lens and the same condenser lens 405 detects diffracted light is also similar. To detect diffracted light, a lens 408 is provided with the same focal distance and the same aperture as the condenser lens 405 and is installed in a confocal position. As for the definition of whether an angle of incidence with the grating and an angle of diffraction are positive or negative, when incident light is incident from the upside of the perpendicular 75, the angle of incidence shall be positive and when outgoing diffracted light is on the downside of the perpendicular 75, its angle of diffraction shall be positive. At this time, a basic expression of the grating is expressed as follows.

$$d(\sin\alpha - \sin\beta) = m\lambda \quad (1)$$

In this case, "m" denotes an order of diffraction and "$\lambda$" denotes a wavelength of light in the pickup.

Figure 7:
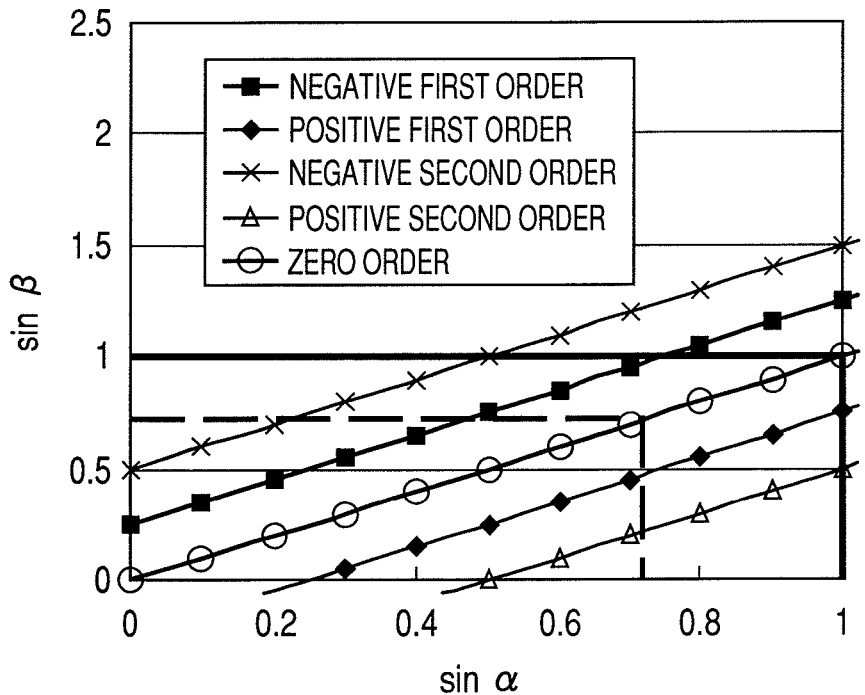
FIG. 7 shows relation between incidence and diffraction based upon a grating basic expression.

FIG. 7 shows a case that d=4$\lambda$ in the expression (1). An abscissa and an ordinate denote sin $\alpha$ and sin $\beta$. In FIG. 7, relation between incident lights incident on a negative second order to a positive second order and reflected diffracted lights is shown. When NA of the reflected light condenser lens 405 is sin $\theta$, sin $\alpha$ between cos $\theta$ and 1 can be incident light on the grating. Similarly, sin $\beta$ of diffracted light which can be incident on an aperture of the lens 408 is also in a range between cos $\theta$ and 1. FIG. 7 shows a case that cos $\theta$ is 0.7 and sin $\alpha$ between a thick full line and a thick broken line in the abscissa is equivalent to a range of incident light. As diffracted light is also transmitted in the same lens, diffracted light in a range between 0.7 and 1 as values of sin $\beta$ can be incident on the lens 408. As for negative second-order light, as a value of sin $\beta$ exceeds 1, no diffracted light is generated. As for positive second-order light, as a value of sin $\beta$ of is below 0.7, diffracted light goes out of the aperture of the lens 408. As for negative first-order light, diffracted light in the vicinity of 0.7 as a value of sin $\alpha$ is transmitted in the lens 408 and as for positive first-order light, light the value of the sin $\alpha$ of which is 1 can be transmitted. As high-order diffracted light not shown in FIG. 7 is expressed by an outer straight line, it is not incident on the lens 408. Therefore, a condition that diffracted light except a zero order is not incident on the lens 408 is not required to be considered if only a condition that positive and negative first-order lights are not incident is considered. When the pitch of the grating is narrowed, the positive and negative first-order lights depart from a line of zero-order light.

To acquire the condition that diffracted light is not incident on the lens 408, such pitch that a value when sin $\alpha$=0.7 exceeds 1 has only to be calculated in view of a line of the negative first-order light. As a lower limit value on the x-axis and the y-axis in FIG. 7 is cos $\theta$, a condition on which an expression, sin $\beta$=cos $\theta$+$\lambda$/d>1 comes into effect is acquired. When this is transformed into an expression for determining the maximum value of pitch, the expression is as follows.

$$\frac{d}{\lambda} < \frac{1}{1 - \sqrt{1 - \sin^2\theta}} = \frac{1}{1 - \sqrt{1 - NA^2}} \quad (2)$$

Figure 8:
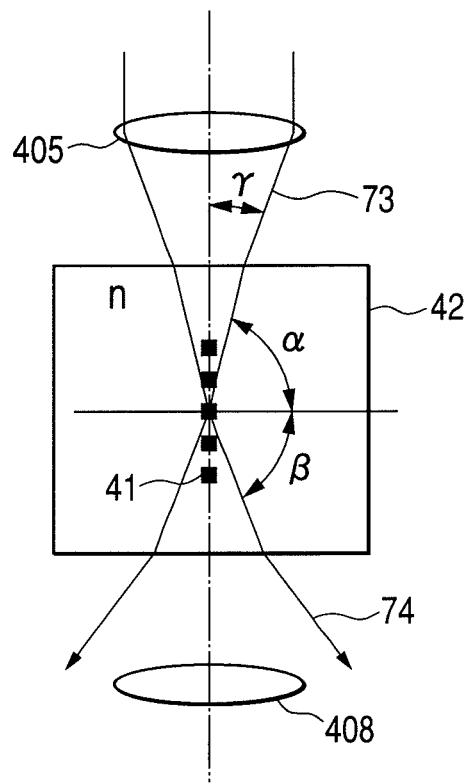
FIG. 8 shows incidence and diffraction when the grating is located in a transparent object.

Next, FIG. 8 shows a case that the grating is located in a transparent object the refractive index of which is n. Its plane of incidence from the lens 405 and its outgoing plane to the lens 408 shall be perpendicular to the optical axis. As an angle of incidence of incident light is $\nu$, an expression of sin $\gamma$=n·sin ($\pi$/2−$\alpha$) is acquired. When this condition is used, the expression (2) is expressed as follows.

$$\frac{d}{\lambda} < \frac{1}{1 - \sqrt{1 - (\sin\theta/n)^2}} = \frac{1}{1 - \sqrt{1 - (NA/n)^2}} \quad (3)$$

Figure 9:
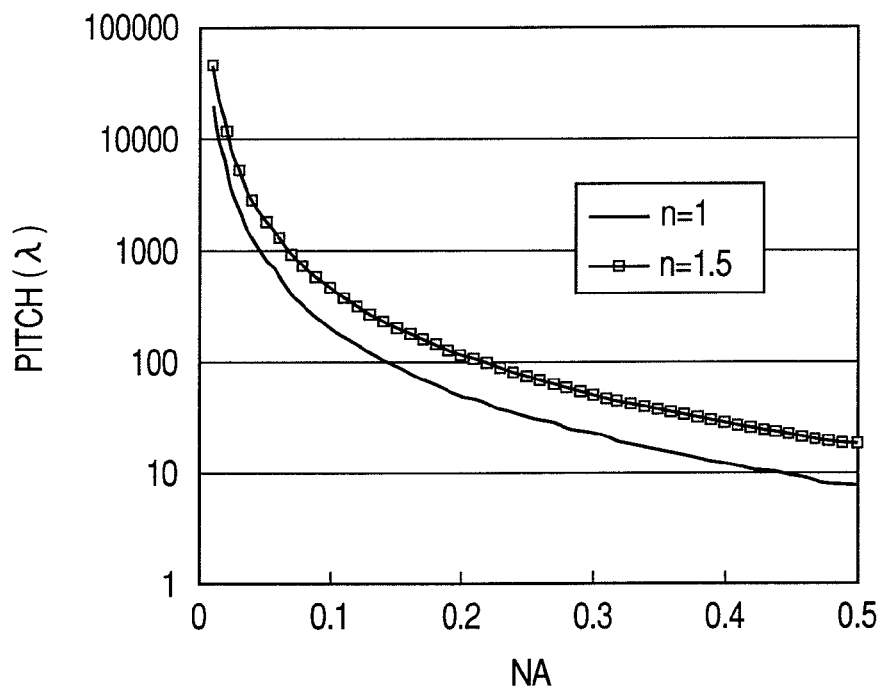
FIG. 9 shows maximum pitch to prevent positive and negative first- or higher-order diffracted lights by grating from being incident on a lens for NA of the lens.

FIG. 9 shows the maximum pitch in which the positive and negative first-order lights do not reach the lens of the grating in the transparent object in air and at the time of n=1.5 with NA of the lens on the x-axis. However, the pitch is calculated based upon a wavelength in the transparent object. When the NA of the lens is determined referring to FIG. 9, the positive and negative first-order lights are not incident on the lens 408 if only a grating of narrower pitch than the maximum pitch shown in FIG. 9 is used.

Figure 10:
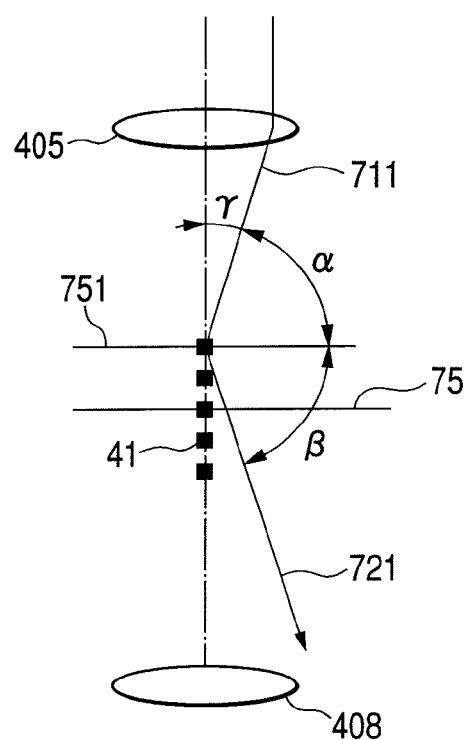
FIG. 10 shows diffraction by the grating when reflected light from another layer is converged in front of a focal position of a reflected light condenser lens.
Figure 11:
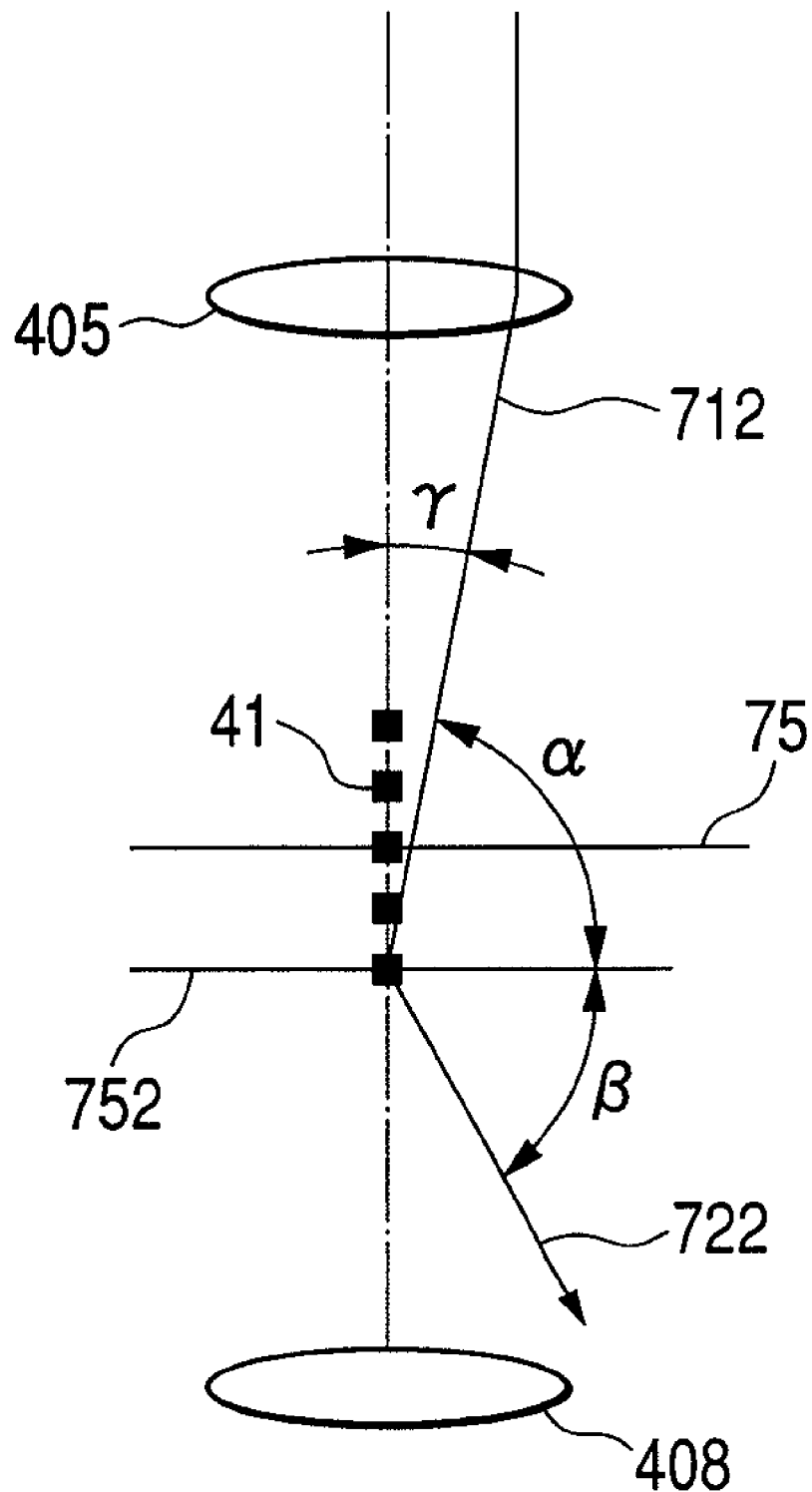
FIG. 11 shows diffraction by the grating when reflected light from another layer is converged at the back of the focal position of the reflected light condenser lens.

It is estimated that the incident light shown in FIG. 6 crosses the optical axis in an intermediate position 75 of distance between the condenser lens 405 and the lens 408; however, reflected light from another layer crosses the optical axis in a position 751 close to the condenser lens or in a position 752 close to the lens 408 as shown in FIGS. 10 and 11. In these cases, effective NA when the lenses 405 and 408 are viewed from a defocused position has only to be considered.

In FIG. 10, the effective NA of the condenser lens 405 shall be $\sin \theta_1$ and the effective NA of the lens 408 shall be $\sin \varsigma$. At this time, relation that $\sin \theta_1 > \sin \theta > \sin \eta_1$ is acquired. When the effective NA is applied to FIG. 7, a range of the incident light in the abscissa is from $\sin \theta_1$ to 1 and an allowable range of diffracted light is from $\sin \varsigma$ to 1. If a range of pitch of the grating meets the following expression, the positive and negative first- or higher-order diffracted lights are not incident on the lens 408.

$$\frac{d}{\lambda} < \frac{1}{1 - \sqrt{1 - \sin^2 \theta_1}} \quad (4)$$

When reflected light from another layer converges in the position 752 farther than a focal position of the reflected light condenser lens 405 as shown in FIG. 11, the effective NA, $\sin \theta_2$ of the reflected light condenser lens 405 is smaller than $\sin \theta$ and the effective NA, $\sin \eta_2$ of the lens 408 is larger than $\sin \theta$. A condition of pitch at which diffracted light is not incident on the lens 408 at this time may be a condition that diffracted light when $\sin \alpha$ of the positive first-order light is 1 is not incident on the lens 408. That is, the condition is expressed as follows.

$$\frac{d}{\lambda} < \frac{1}{1 - \sqrt{1 - \sin^2 \eta_2}} \quad (5)$$

As $\sin \theta_1 = \sin \eta_2$ when distance between the focal position 75 of the reflected light condenser lens 405 and the focal position 751 and distance between the focal position 75 and the focal position 752 are the same, the expressions (4) and (5) are equal. When respective distance is different, the expression having narrower pitch may be adopted. Generally, if effective NA at which a focused position of reflected light from another layer of the multi-layer optical disc is the farthest is used in the expression (4) or (5), the positive and negative first- or higher-order lights can be prevented from reaching the lens 408. If only $\sin \theta_1$ or $\sin \eta_2$ in the expression (4) or (5) is replaced with $\sin \theta_1/n$ or $\sin \eta_2/n$ even if the grating is located in the transparent object, maximum pitch can be similarly calculated.

It has been described that the positive and negative first- or higher-order diffracted lights can be prevented from being incident on the lens 408 by narrowing the pitch of the grating; however, zero-order light shown in FIG. 7 is incident on the lens 408 if no measure is taken. To cope with this situation, the zero-order light is prevented from being generated by adjusting the depth of the grating. For example, when a rectangular grating the groove width of which is equivalent to a half of its pitch is used, the zero-order reflected light intensity of vertical incident light can be reduced by setting the depth of the groove substantially to $\lambda/4$. In the invention, as the vertical incident light is diagonally incident on the grating, the adjustment of the depth is required. In a triangular-wave grating, the diagonally incident zero-order reflected light can be attenuated by setting the depth of a groove to $\lambda/2$ or more.

Figure 23:
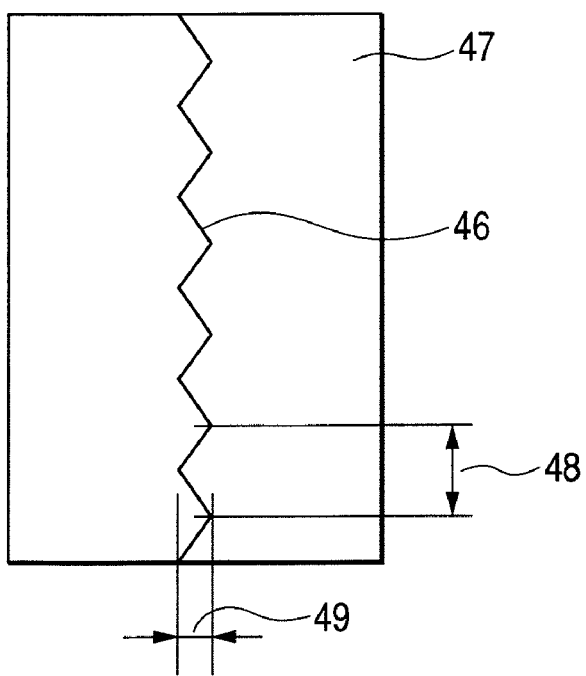
FIG. 23 is a schematic diagram showing a section of the triangular-wave grating.
Figure 24:
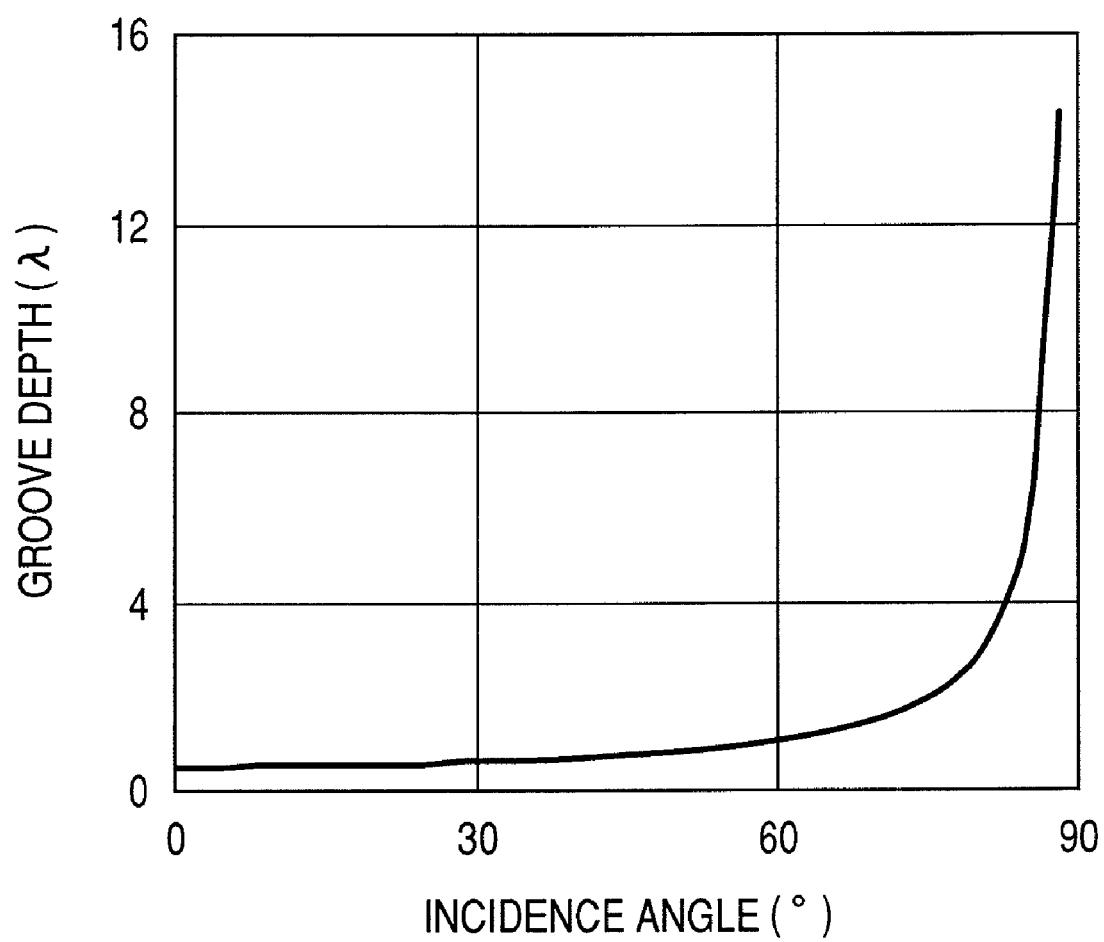
FIG. 24 shows relation between an angle of incidence on the triangular-wave grating and the shallowest depth in which zero-order light is a minimum.

FIG. 23 shows a section of the triangular-wave grating. A reference numeral 46 denotes a grating part and the grating part is buried in a transparent object 47. A reference numeral 48 denotes pitch of the grating and 49 denotes depth. FIG. 24 shows the shallowest groove depth in which zero-order light is substantially close to zero for an angle of incidence on the triangular-wave grating. The depth is denoted in units of a wavelength in the object. It is supposed that the grating part is made of aluminum and the refractive index of the transparent object is 1.5. When an angle of incidence is zero at which reflected light is vertically incident on the grating, the zero-order light is reduced at the depth of $0.5\lambda$. The larger an angle of incidence is, the larger the shallowest depth of the groove is though the zero-order light is a minimum. In the case of a triangular-wave grating, in a grating deeper than the shallowest depth at a certain angle of incidence, zero-order light can be also similarly reduced and when a sufficiently deep triangular-wave grating is used, zero-order reflected light at a wide angle of incidence can be reduced. In another type grating, the intensity of zero-order light can be also reduced by adjusting the depth.

As described above, zero-order light, positive and negative first- or higher-order lights can be prevented from being incident on the lens by the grating installed on the optical axis. In the case of a reflector type grating, as the grating the surface and the back of which have the same pitch can be formed, the surface and the back similarly act. Therefore, the back of the surface used for explanation also has the same effect that the grating can prevent all reflected lights incident from the reflected light condenser lens 405 from being incident on the lens 408.

In the meantime, reflected light from the corresponding layer is focused in a position of the focal distance of the reflected light condenser lens 405 in FIG. 10 for example. As the reflected light cannot reach the lens 408 if the grating is located in this position, the grating is set off this position to prevent the grating from having an effect. Hereby, the reflected light from the corresponding layer can reach the lens 408; however, reflected light from another layer which irradiates the grating cannot reach the lens 408 by the action of the grating.

Referring to the drawings, embodiments of the optical pickup according to the invention will be described below.

Figure 12:
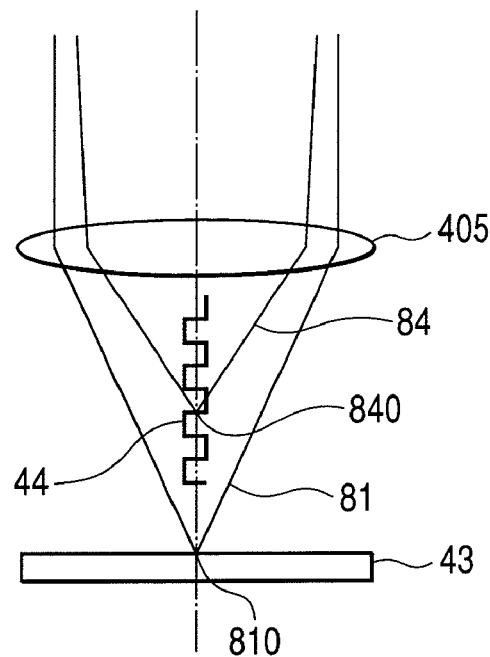
FIG. 12 illustrates a situation in which reflected light from another layer farther from an objective lens than a corresponding layer irradiates a rectangular grating installed on the optical axis between the reflected light condenser lens and a reflector.

An objective lens receives reflected light from a multi-layer disc and a reflected light condenser lens 405 converges it as shown in FIG. 12. A reference numeral 81 denotes reflected light from a corresponding layer and 84 denotes reflected light from an adjacent layer far from the objective lens. When a minimum spot position of the reflected light 81 from the corresponding layer is 810, the reflected light 84 from the far adjacent layer forms a minimum spot in a position 840 closer to the reflected light condenser lens 405. As no grating 44 is located in the minimum spot position of the reflected light 81 from the corresponding layer and a reflector 43 is installed, the reflected light 81 is returned to the reflected light condenser lens 405 without being influenced by the grating 44 and makes toward a photodetector. In the meantime, the grating 44 is located in the position 840 in which the reflected light 84 from the far adjacent layer is converged and prevents the reflected light 84 from returning to the reflected light condenser lens 405. The grating 44 is a rectangular reflector type grating the groove width of which is equivalent to a half of pitch and the depth of the groove is $\lambda/4$. When the refractive index of the transparent object in which the grating is buried is 1.5, available maximum grating pitch is approximately $450\lambda$ and a grating having narrower pitch than this has only to be used. In this case, the pitch is calculated, assuming that converged positions of the reflected lights from the adjacent layer and from the corresponding layer are substantially the same.

Figure 13:
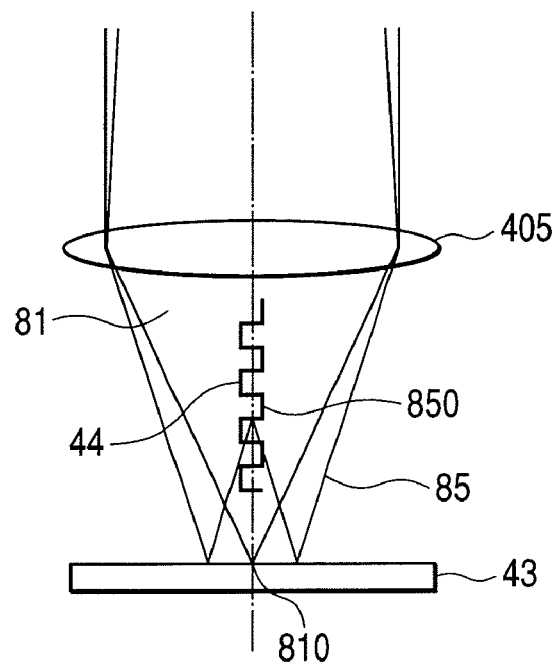
FIG. 13 illustrates a situation in which reflected light from another layer closer to the objective lens than the corresponding layer irradiates the rectangular grating installed on the optical axis between the reflected light condenser lens and the reflector.

FIG. 13 shows a state of reflected lights when the adjacent layer is closer to the objective lens than the corresponding layer. When layer-to-layer spacing is substantially the same as a case that the adjacent layer is farther from the objective lens than the corresponding layer, the reflected light from the adjacent layer is a minimum spot in a position 850 turned back by the reflected light condenser lens 405 and the reflector 43. As the position 850 in FIG. 13 and the position 840 in FIG. 12 are substantially the same position, the reflected light 85 is greatly influenced by the same grating 44 and does not return to the reflected light condenser lens 405. As the reflected light 81 from the corresponding layer is similar to that shown in FIG. 12, the reflected light is returned to the reflected light condenser lens 405 without being greatly influenced by the grating 44.

Figure 14:
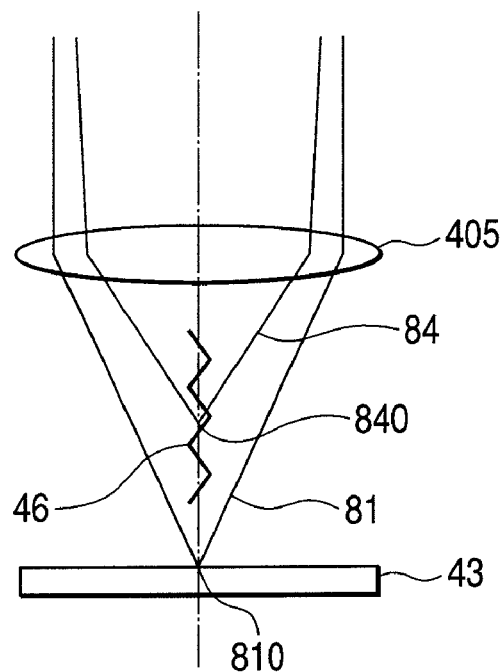
FIG. 14 illustrates a situation in which reflected light from another layer farther from the objective lens than the corresponding layer irradiates a triangular-wave grating installed on the optical axis between the reflected light condenser lens and the reflector.
Figure 15:
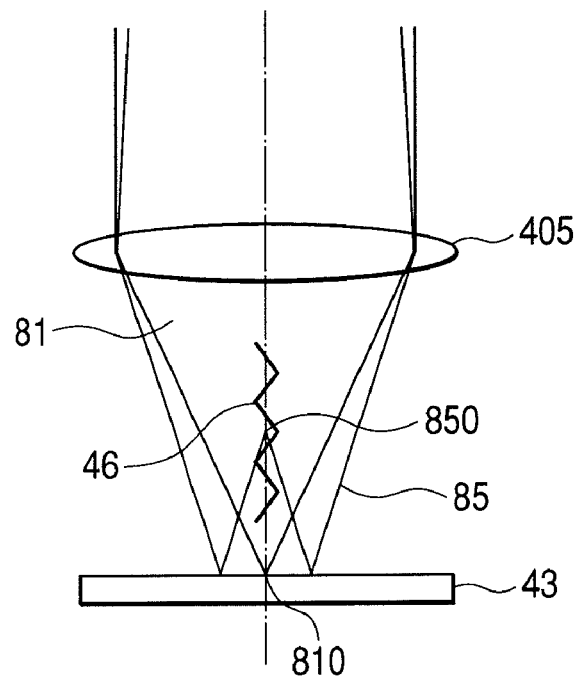
FIG. 15 illustrates a situation in which reflected light from another layer closer to the objective lens than the corresponding layer irradiates the triangular-wave grating installed on the optical axis between the reflected light condenser lens and the reflector.

FIGS. 14 and 15 show triangular-wave gratings. FIG. 14 shows a case that another layer is farther than the corresponding layer when another layer is viewed from the objective lens and FIG. 15 shows a case another layer is closer than the corresponding layer. In the case of the triangular-wave grating, even if an angle of incidence to the grating increases, the triangular-wave grating has effect that the efficiency of zero-order light can be reduced.

When convex and concave surfaces of the gratings shown in FIGS. 12 to 15 are made of thin-film material such as chromium and nickel that absorb a laser beam, the intensity of the reflected light from the adjacent layer which returns to the reflected light condenser lens 405 as stray light can be further attenuated. Hereby, the reflected light 841 shown in FIG. 5 from the adjacent layer on the photodetectors can be removed and interference with the main beam 811 and the subbeams 812, 813 is removed.

The gratings shown in FIGS. 12 to 15 are plane and are installed with the gratings including the optical axis. As the plane gratings are thin enough and do not include the minimum spot position of the reflected light 81 from the corresponding layer, the reflected light from the corresponding layer does not irradiate each grating. Therefore, as the reflected light from the corresponding layer is hardly influenced by each grating installed on the optical axis and the central intensity of the reflected light is not attenuated by each grating, the quality of a data signal is hardly deteriorated by the variation of the quantity of the reflected light from the corresponding layer.

Figure 4:
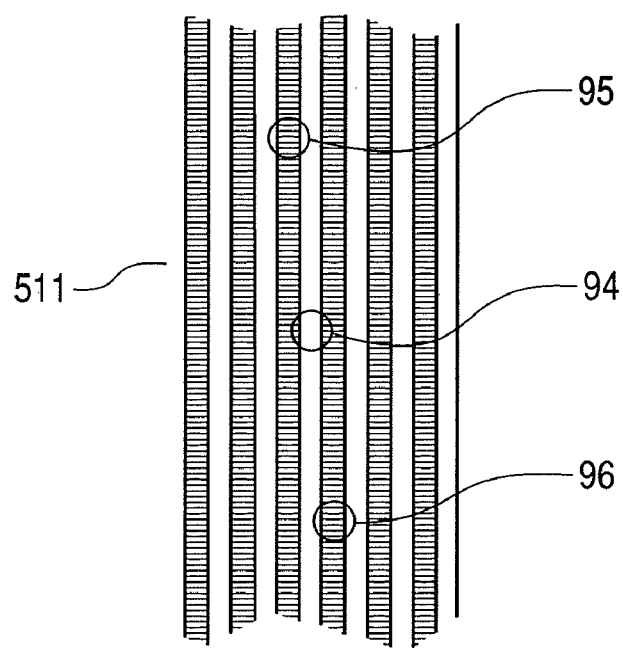
FIG. 4 shows a state in which one main beam and two subbeams irradiate a grooved recording face.
Figure 16:
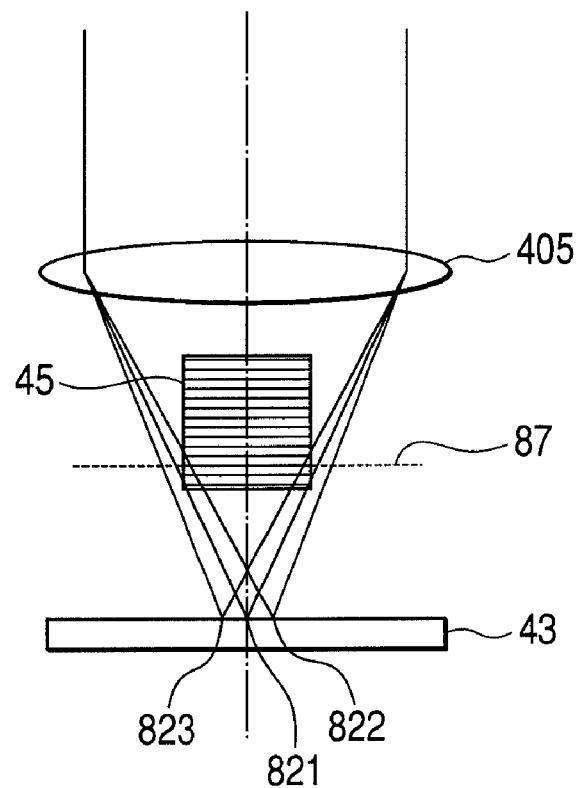
FIG. 16 shows an installed direction of a grating when three beams are used.
Figure 17:
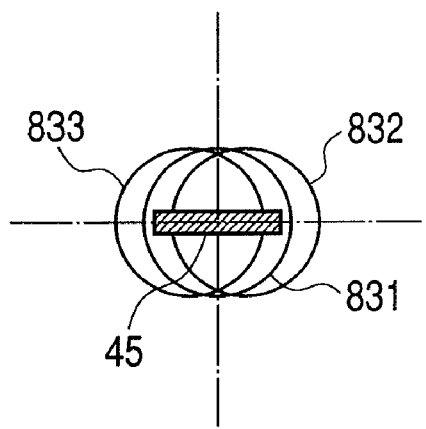
FIG. 17 shows relation between the distribution of the quantity of reflected lights from the corresponding layer of the three beams and a position of the grating.
Figure 18:
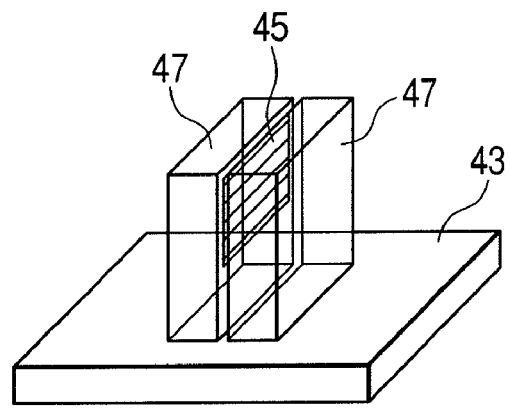
FIG. 18 is a schematic diagram showing a grating supported by transparent objects on the reflector.

For an optical pickup, not only the one-beam optical system but the three-beam optical system shown in FIG. 4 are often used. The invention is naturally effective for not only the one-beam optical system but the three-beam optical system. Referring to FIGS. 16 and 17, a direction in which a grating when three beams are used is installed will be described below. FIG. 16 shows a state in which three beams reflected on the corresponding layer of the multi-layer disc are focused by the reflected light condenser lens 405. The reflector 43 is located in a minimum spot position, a reference numeral 821 denotes a position in which the main beam is focused, and 822 and 823 denote positions in which each subbeam is focused. The plane grating 45 installed between the reflected light condenser lens and the reflector is installed in parallel with a paper face and includes the optical axis of the reflected light condenser lens 405. The focused positions 821, 822, 823 shall be included in a plane acquired by imaginarily extending a plane of the grating 45. FIG. 17 shows the distribution of the intensity of beams on the plane 87 which is perpendicular to the grating 45 and the optical axis of the reflected light condenser lens 405. A reference numeral 831 denotes the distribution of the main beam and the center is equivalent to the optical axis; however, a principal ray of the subbeam is inclined, and the center of the distribution is off. The grating 45 is required to have no effect on the main beam and the subbeams from the corresponding layer and therefore, the grating 45 is installed in a plane including the optical axis and the principal rays of the subbeams. As the grating 45 installed in this direction does not cross the subbeams, it has no effect on them. When the area of the grating 45 is sufficiently increased and the grating includes minimum spot positions of reflected light from the adjacent layer of the subbeams, stray light by the adjacent layer of the subbeams can be also removed. FIG. 18 shows a state in which a grating is supported by transparent objects. The plane grating 45 is supported between the two transparent objects 47 with the grating closely stuck to the two transparent objects. For the material of the grating 45, material that reflects a laser beam or material that absorbs a laser beam, for example, a metal thin film of chromium and nickel can be used. The transparent object 47 may be made of glass or plastic that transmits a used laser beam. The two transparent objects 47 are closely stuck to the grating by an adhesive having the same refractive index as the transparent object so as to prevent a laser beam from being reflected in closely stuck parts. Concretely, the grating is formed over the surface of one transparent object (one transparent substrate) 47 by forming a deposited film of chromium or nickel in an area for the grating to be formed, the other transparent object (the other transparent substrate) 47 is closely arranged over the deposited film, and the adhesive having the same refractive index as the transparent object 47 is filled between the transparent object and the grating. The area where the grating is formed is equivalent to an area apart from the reflector 43 on the upside of the optical axis out of the surface of the transparent object (the transparent substrate) 47. The transparent object 47 is installed on the reflector 43 and reflected light from the optical disc is reflected by the reflector 43. In FIG. 18, the reflector 43 and each transparent object 47 are touched; however, clearance may be also provided between both.

Upper and lower faces of the two transparent objects 47 are planes perpendicular to the optical axis. It is desirable that reflection reducing coating is provided to the upper faces of the two transparent objects 47, that is, the faces on which reflected light is incident. Further, the lower faces of the two transparent objects 47, that is, the faces on the sides of the reflector 43 maybe also a reflecting surface. In that case, the reflector 43 can be also removed.

Figure 19:
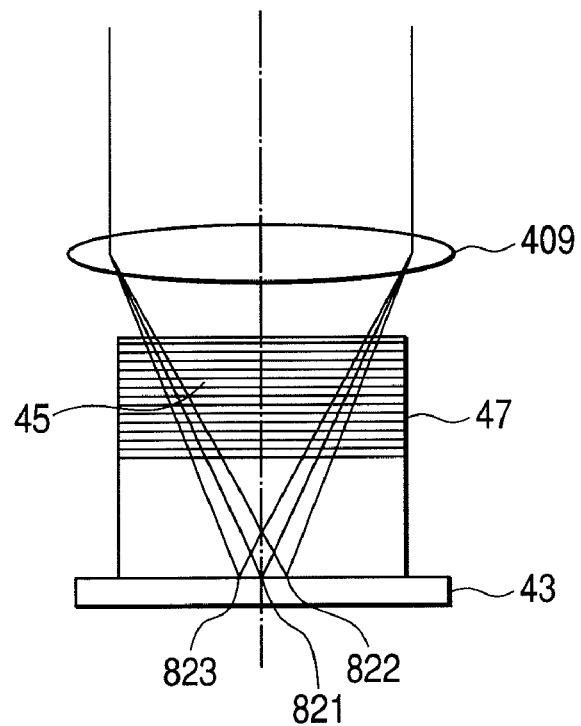
FIG. 19 shows a method of extracting reflected lights from the corresponding layer of three beams using the plane grating supported on the reflector and the reflected light condenser lens and removing reflected light from an adjacent layer.

FIG. 19 shows a state in which the grating 45 supported by the transparent objects 47 shown in FIG. 18 and a reflected light condenser lens 409 are used. In FIG. 19, only three reflected lights from the corresponding layer are shown. The reflected lights from the corresponding layer are reflected by the reflector 43 in clearance between the grating 45 and the reflector 43 and return to the reflected light condenser lens 409 without being influenced. When the reflected light condenser lens 409 having large NA is used, the reflected lights from the corresponding layer include spherical aberration because of the plane transparent object 47 different from its circumference in a refractive index. Therefore, the reflected light condenser lens 409 is designed so that the spherical aberration is a minimum in view of the transparent objects. Hereby, when the reflected lights from the corresponding layer are reflected by the reflector 43 and are outgoing from the reflected light condenser lens 409, they can be made plane waves without aberration.

Figure 20:
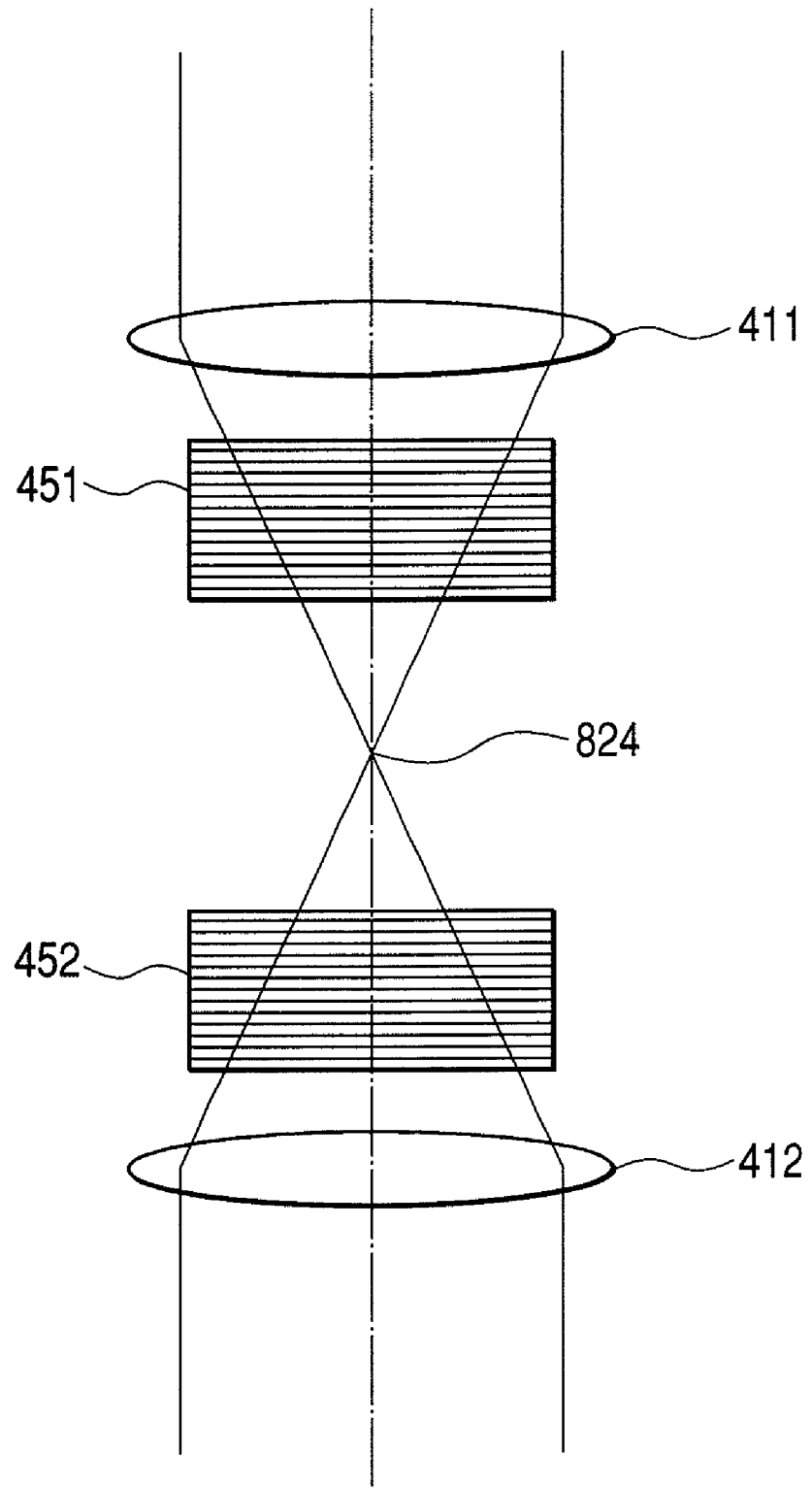
FIG. 20 shows a transmitted light method of removing reflected light from another layer using two gratings and two condenser lenses without using a reflector.

The methods of using the reflector and each grating have been described; however, in principle, a transmission type can also remove reflected light from another layer. As shown in FIG. 20, reflected light from the multi-layer disc is focused by a reflected light condenser lens 411 and a reference numeral 824 denotes a focal position. Plane gratings 451 and 452 are arranged including an optical axis, the grating 451 is located on the side of the reflected light condenser lens 411 based upon the focal position 824 as a reference point, and the grating 452 is installed close to a lens 412 through the focal position 824. Reflected light from the corresponding layer passes the focal position and can be transmitted without being influenced by the gratings 451, 452. In the meantime, as reflected light from an adjacent layer apart from the objective lens is converged into a minimum spot position on the grating 451, the quantity of the reflected light that reaches the condenser lens 412 decreases and reflected light from an adjacent layer close to the objective lens is also reduced by the grating 452. As a result, as no reflected light from another layer reaches a detecting optical system arranged at the back of the condenser lens 412, a data signal and a control signal including no layer-to-layer crosstalk from another layer can be acquired.

When the reflector and the grating are used, reflected light from another layer can be more efficiently removed in a case that the grating is located as close to the reflector as possible. However, when the grating is located too close to the reflector, not only reflected light from the corresponding layer decreases but an AF signal is also influenced. When distance between the reflector and the grating is too small, a range in which the AF signal is detected is made narrower than a designed range and the situation may hinder focusing on the recording layer. To avoid this situation, when magnification determined by the objective lens and the reflected light condenser lens is m and a range in which a focus error signal is detected is c, distance between the reflector and the grating is required to be longer than $c \times m^2$. In the case of the transmission type with no reflector, distance between the gratings is required to be longer than $2c \times m^2$.

In methods of attenuating reflected light from another layer in the combination of the reflector and the grating, it is premised that one grating is used; however, in the case of the one-beam optical system, plural gratings can be used and reflected light from another layer can be efficiently removed. In FIG. 12 or 13, the plane grating 44 is installed perpendicularly to the paper face; however, for example, the same type of grating turned by 90 degrees around the optical axis is further added and the efficiency of the removal of the reflected light from another layer can be enhanced.

Next, embodiments of the invention will be described in more details.

First Embodiment

Figure 1:
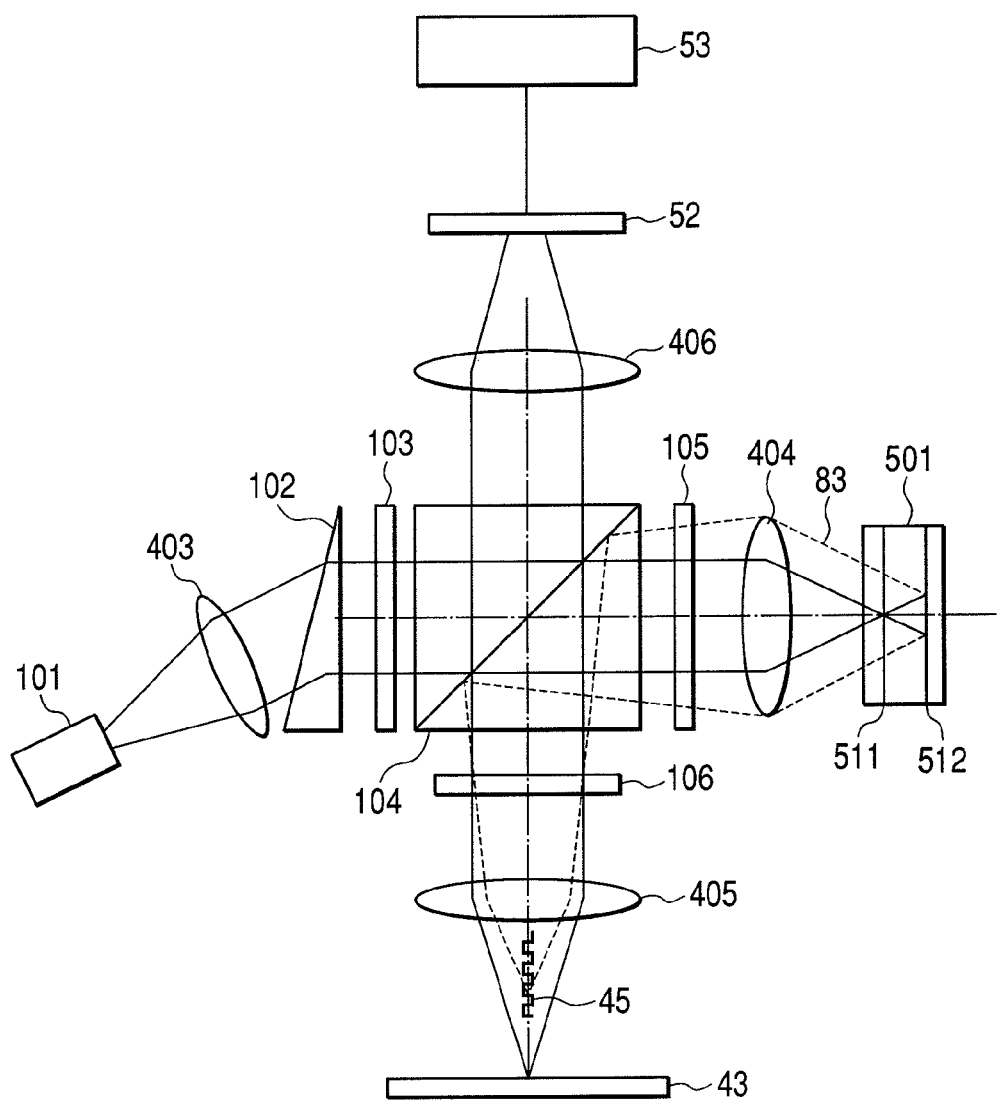
FIG. 1 shows one example of an optical system of an optical pickup according to the invention.

FIG. 1 shows an optical system of an optical pickup according to a first embodiment of the invention. A laser beam radiated from a semiconductor laser 101 is converted into a circular collimated light beam by a collimator lens 403 and a triangular prism 102. The collimated beam is split into three beams by a diffraction grating 103 to be one main beam and two subbeams. The traveling direction of the main beam is the same as that of an incident beam; however, the subbeams are turned outgoing beams having a certain gradient on both sides of an optical axis. Normally, difference in the quantity of light between the main beam and the subbeam is set to 10 times or more. The three beams are transmitted in a polarizing beam splitter 104, are converted into circularly polarized waves by a quarter-wave lambda plate 105, and are focused on a multi-layer disc 501 rotated by a rotating mechanism by an objective lens 404. In this case, a two-layer disc is shown as the multi-layer disc 501; however, this embodiment is not limited to the two-layer disc, and can be also applied to a three- or more-layer disc. A reference numeral 511 denotes a reading layer (a corresponding layer) and a minimum spot of the laser beam is located on the layer 511. Reflected light 83 is also caused from an adjacent layer 512 to be stray light that causes crosstalk.

Figure 5:
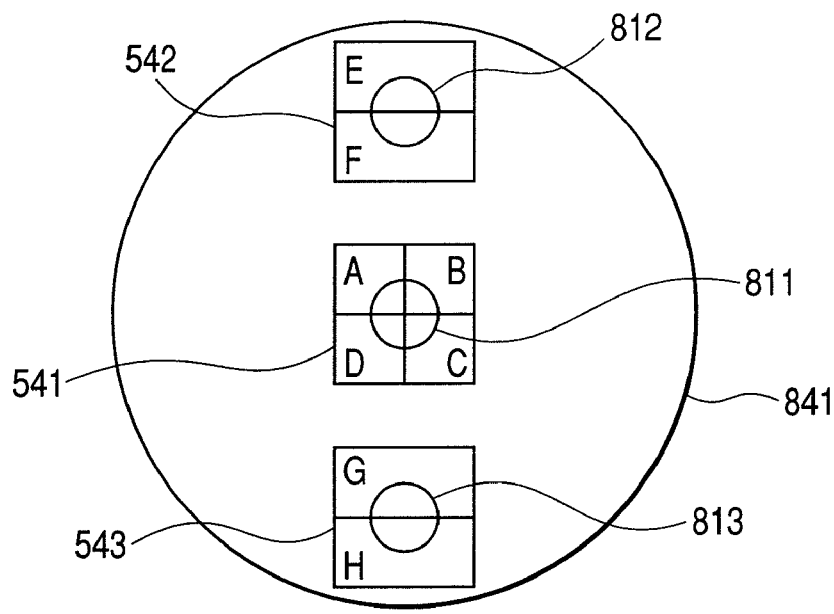
FIG. 5 shows shapes of photodetectors, positions and spreads of light spots of reflected light from an optical disc.

The reflected light from the multi-layer disc including the stray light is returned to the objective lens 404 and is converted into linearly polarized light in a direction perpendicular to an original polarization direction by the quarter-wave lambda plate 105. Therefore, the reflected light is reflected in the polarizing beam splitter 104, is directed toward a quarter-wave lambda plate 106, and is converted into a circularly polarized wave there. Afterward, the reflected light is focused by a reflected light condenser lens 405 and is reflected by a reflector 43 located in a minimum spot of the reflected light from the corresponding recording layer 511. A plane grating 45 is installed between the reflected light condenser lens 405 and the reflector 43 with the grating including an optical axis. The grating 45 is rectangular and does not return the reflected light from the other layer that is incident on the grating to the reflected light condenser lens. A direction of grooves of the grating is not necessarily required to be completely perpendicular to the optical axis. Even if the direction is slightly off a completely perpendicular direction, the effect is not greatly damaged. The reflected light from the corresponding layer reflected by the reflector 43 is returned to the reflected light condenser lens 405, is turned linearly polarized light in a polarization direction perpendicular to a polarization direction in incidence by the quarter-wave lambda plate 106, and is transmitted in the beam splitter 104. A reference numeral 406 denotes a condenser lens including astigmatism and a photodetector 52 is located in a position of a minimum circle of confusion. FIG. 5 shows a shape of a sensitive part of the photodetector 52. A signal from the photodetector 52 is processed in a signal processing circuit 53, and an AF signal that controls a position of a light spot, a TR signal and an RF signal which is a data signal are generated.

Figure 21:
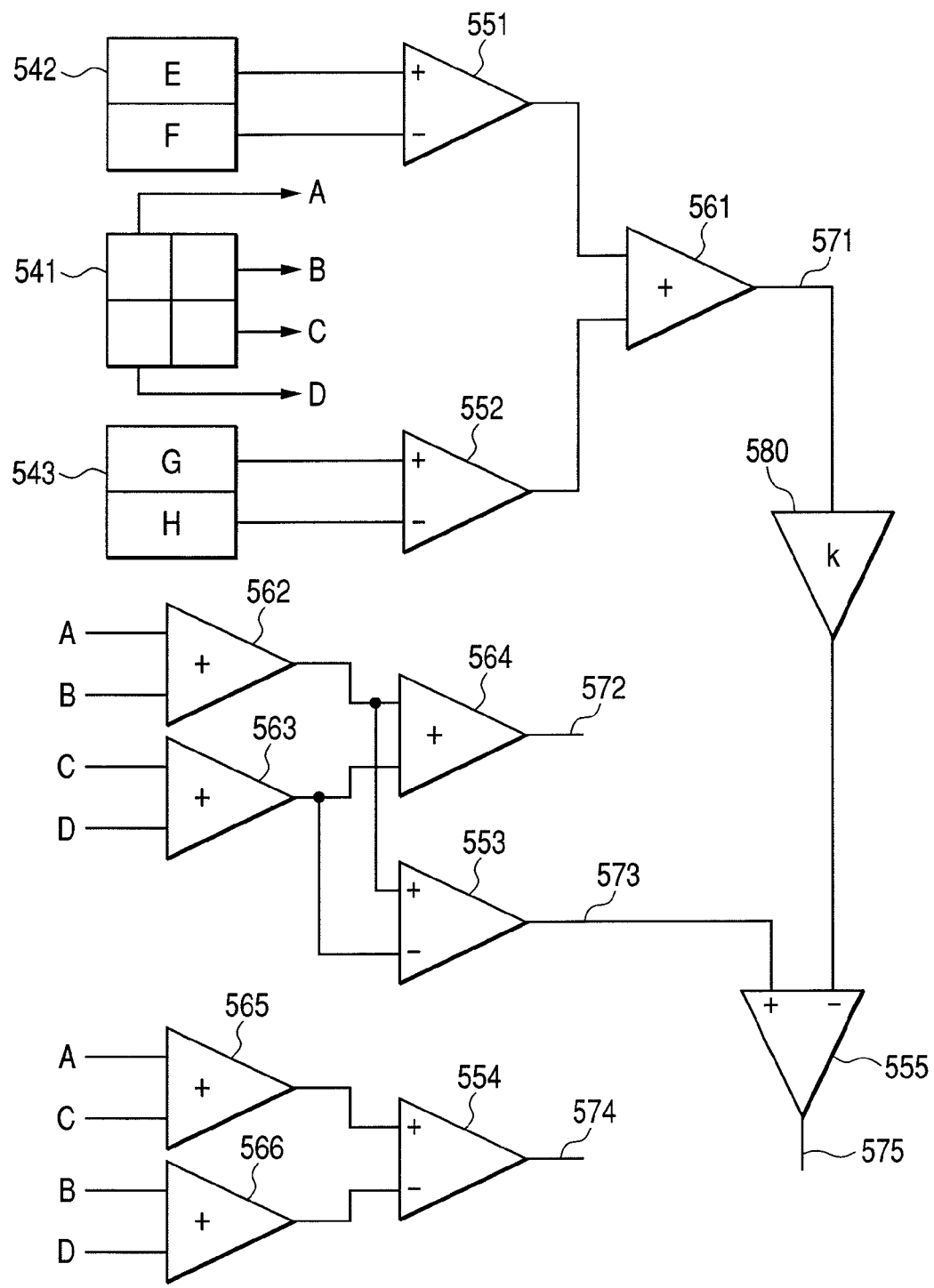
FIG. 21 shows an outline of a signal processing circuit.

FIG. 21 shows an electronic circuit for signal processing. Photodetectors 541, 542, 543 are the same as the sensitive part shown in FIG. 5. The quadruple photodetector 541 detects the main beam and the two-piece photodetectors 542, 543 detect respective subbeams. Reference numerals 551 to 555 denote a differential amplifier and 561 to 566 denote an adder. A reference numeral 580 denotes a k-fold amplifier and the "k" is a value determined in view of the intensity ratio of the main beam to the subbeam. A signal from each photodetector is processed in the electronic circuit after it is amplified in a preamplifier to be a control signal or a data signal. A signal 572 acquired by adding all A, B, C and D which are outputs from the quadruple photodetector is a data signal. A reference numeral 574 denotes the AF signal by astigmatization. A reference numeral 573 denotes a push-pull signal based upon the main beam and 571 denotes a sub push-pull signal based upon the subbeam. The signal 571 is amplified to be k times by the amplifier 580 and is processed together with the push-pull signal 573 based upon the main beam in the differential amplifier 555 to be the TR signal 575.

According to this embodiment, a phenomenon that a tracking error signal varies according to the variation of layer-to-layer spacing can be reduced. As reflected light of a main beam from the adjacent layer and reflected light of the subbeam from the corresponding layer for tracking interfere and their phase difference varies depending upon the layer-to-layer spacing, the sub push-pull signal varies; however, as the effect of the reflected light from the adjacent layer can be reduced by the invention, the variation of the tracking error signal decreases. Hereby, the high-precision control of a laser beam irradiation position is enabled and as the laser beam irradiation position in reading and writing can be precisely determined, the quality of the signals is enhanced. As the reflected light from the adjacent layer is hardly mixed with the data signal itself, the data signal substantially free of errors can be acquired.

In this embodiment, the polarizing-type optical system is used; however, when the semiconductor laser sufficiently affords to output at the maximum, an optical system in which the polarizing beam splitter 104 is replaced with a normal beam splitter and from which the quarter-wave lambda plates 105, 106 are removed can be also used.

Besides, in this embodiment, the rectangular grating 45 is used; however, it need scarcely be said that when a triangular wave grating shown in FIG. 23 is installed instead, the similar effect can be also acquired.

Second Embodiment

Figure 2:
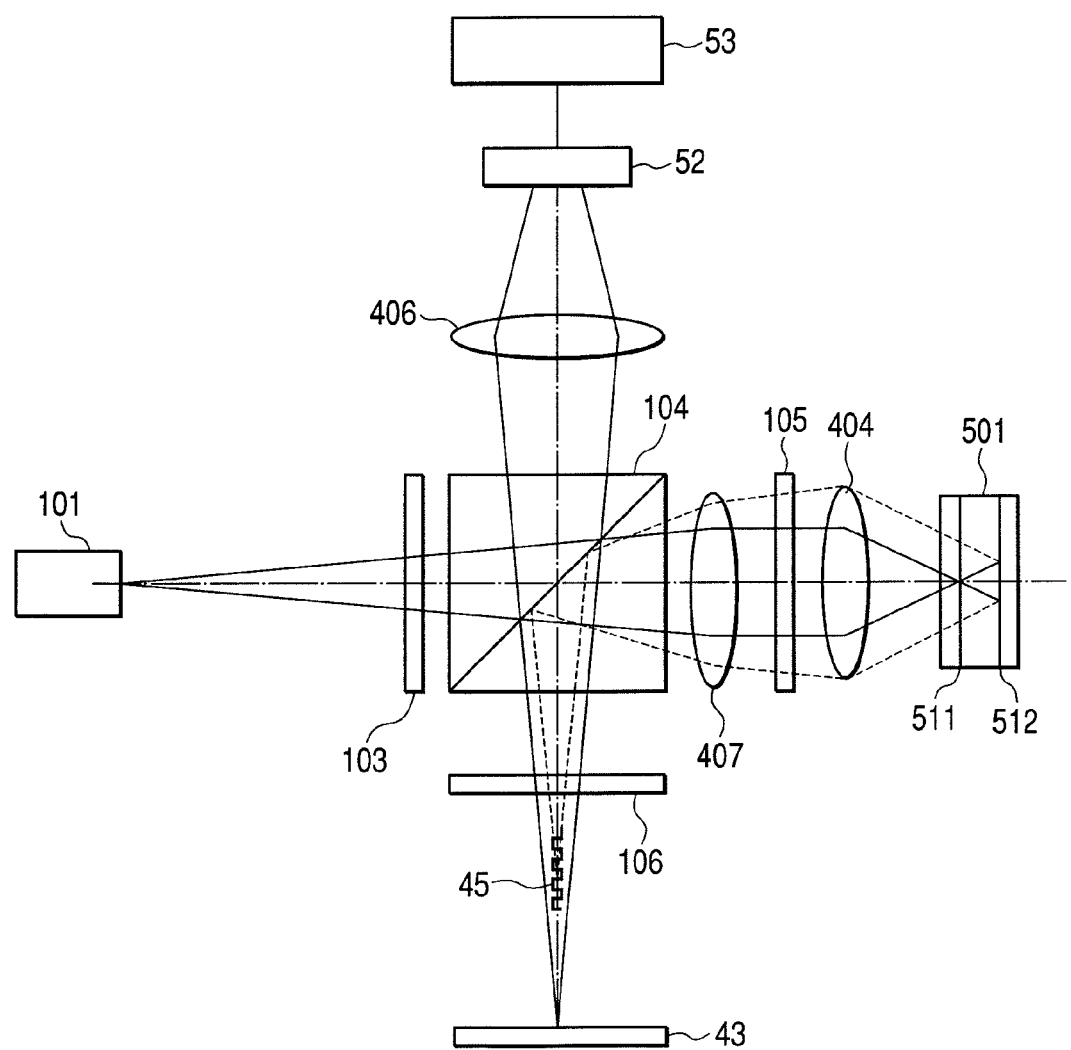
FIG. 2 shows one example of an optical system of the optical pickup according to the invention.
Figure 3:
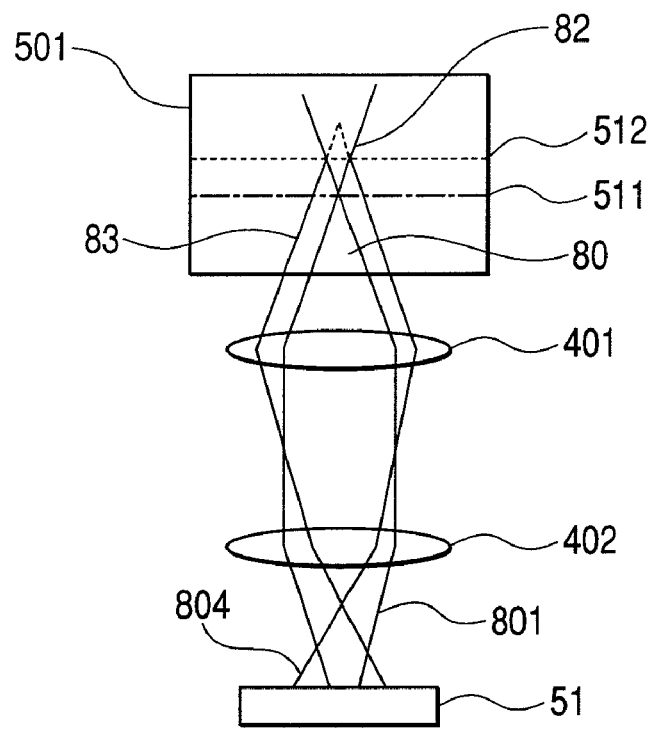
FIG. 3 shows the effect of reflected light from an adjacent layer.

FIG. 2 shows an optical system of an optical pickup according to a second embodiment of the invention. In this embodiment, a diffraction grating 103 and a polarizing beam splitter 104 are installed on the side of a semiconductor laser 101 at the back of a collimator lens 407. Therefore, a laser beam outgoing from the semiconductor laser 101 is transmitted in the polarizing beam splitter 104 in a divergent state, afterward, is collimated by the collimator lens 407, and is incident on a quarter-wave lambda plate 105. In the first embodiment, as the diffraction grating 103 and the polarizing beam splitter 104 are installed between the collimator lens 403 and the objective lens 404, the condenser lens 405 is required; however, in the second embodiment, as shown in FIG. 2, as a light beam reflected from a reading layer 511 of a multi-layer disc 501 is converged through the collimator lens 407, no condenser lens is required. Hereby, effect that the number of parts can be reduced is produced.

Third Embodiment

Figure 22:
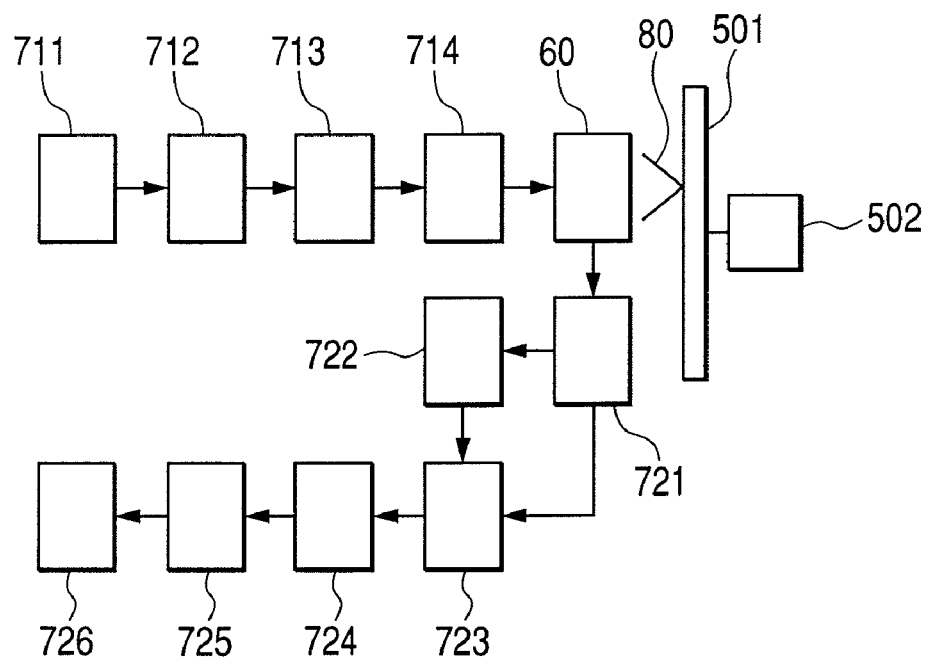
FIG. 22 shows an embodiment of an optical disc drive that can reduce the variation of a sub push-pull signal (SPP)

FIG. 22 shows an embodiment of an optical disc drive that can reduce the variation of a sub push-pull signal (SPP). Circuits 711 to 714 are provided to record data on a multi-layer optical disc 501. In the encoding circuit for error correcting 711, an error correcting code is added to data. The recording encoding circuit 712 modulates data according to a 1-7PP method. The recording compensating circuit 713 generates a pulse for writing suitable for mark length. A semiconductor laser in an optical pickup 60 is driven based upon a generated pulse string by the semiconductor laser driving circuit 714 and a laser beam 80 outgoing from an objective lens is modulated. A phase change film is formed on the optical disc 501 rotated by a motor 502, when the phase change film is heated and is rapidly cooled, it is turned amorphous, and when the phase change film is slowly cooled, it is turned crystalline. These two states are different in reflectance and a mark can be generated. As in writing, high-frequency superimposition that deteriorates the coherency of a laser beam is not performed, reflected light from an adjacent layer and reflected light from a target layer are apt to interfere. Therefore, when no measure to reduce the variation of SPP is taken, a problem that tracking is off and data on an adjacent track is deleted is caused. In this embodiment, any of the optical pickups disclosed in the first to third embodiments is adopted as the optical pickup 60 and no problem of tracking is also caused in the multi-layer disc.

Circuits 721 to 726 are provided to read data. The equalizer 721 improves signal-to-noise ratio in the vicinity of the shortest mark length. A signal output from the equalizer is input to the PLL circuit 722 and a clock is extracted. A data signal processed in the equalizer is digitized in the A-D converter 723 at the timing of the extracted clock. The partial response maximum likelihood (PRML) signal processing circuit 724 executes Viterbi decoding. The recording decoding circuit 725 decodes the data signal based upon a modulation rule of the 1-7PP method and the error correcting circuit 726 restores the data.

According to the invention, the effect of reflected light from the adjacent layer caused when data in the multi-layer optical disc is read in the optical pickup can be reduced. When the data in the multi-layer optical disc is read or data is written to the multi-layer optical disc, a tracking position of a laser beam is required to be precisely controlled over the optical disc by an error signal. Reflected light from the adjacent layer throws the tracking position into disorder because of the variation of the error signal due to interference and a data signal cannot be precisely read or a writing position cannot be precisely determined. In the invention, these problems can be removed. Further, as crosstalk by reflected light from the adjacent layer mixed with a data signal itself can be reduced, the quality of the data signal can be enhanced.

What is claimed is:

1. An optical pickup comprising:
   a laser beam source;
   an irradiating beam focusing optical system that focuses a laser beam from the laser beam source on one recording layer of a multi-layer optical information storage medium; and
   a detecting optical system that detects reflected light reflected from the recording layer of the multi-layer optical information storage medium,
   wherein:
   the detecting optical system includes a reflecting light condenser lens that converges the reflected light from the recording layer, a reflecting plane provided to a minimum spot position of the reflected light from the recording layer out of the reflected light converged by the reflected light condenser lens, a grating which is installed between the reflected light condenser lens and the reflecting plane with the grating including an optical axis and attenuates the quantity of reflected light from an adjacent layer except the corresponding layer or changes a direction of the reflected light, and a photodetector that detects the reflected light;
   reflected light reflected by the reflecting plane is detected on the photodetector;
   the grating is overlapped with at least one of minimum spot positions by the reflected light condenser lens of the reflected light from the adjacent layer; and
   the grating is installed with a direction of grooves of the grating perpendicular to the optical axis or inclined.

2. The optical pickup according to claim 1, wherein:
   the grating is provided apart from the reflecting plane in a direction of the optical axis.

3. An optical pickup comprising:
   a laser beam source;
   an irradiating beam focusing optical system that focuses a laser beam from the laser beam source on one recording layer of a multi-layer optical information storage medium; and
   a detecting optical system that detects reflected light reflected from the recording layer of the multi-layer optical information storage medium, wherein:

the detecting optical system includes a reflecting light condenser lens that converges the reflected light from the recording layer, a reflecting plane provided to a minimum spot position of the reflected light from the recording layer out of the reflected light converged by the reflected light condenser lens, a grating which is installed between the reflected light condenser lens and the reflecting plane with the grating including an optical axis and attenuates the quantity of reflected light from an adjacent layer except the corresponding layer or changes a direction of the reflected light, and a photodetector that detects the reflected light;

reflected light reflected by the reflecting plane is detected on the photodetector; and the grating is provided with groove depth that decreases the quantity of zero-order light.

4. The optical pickup according to claim 3, wherein:
the grating is a triangular-wave grating; and
the groove depth is 0.5 λ or more.

5. An optical pickup comprising:
a laser beam source;
an irradiating beam focusing optical system that focuses a laser beam from the laser beam source on one recording layer of a multi-layer optical information storage medium; and
a detecting optical system that detects reflected light reflected from the recording layer of the multi-layer optical information storage medium,
wherein:
the detecting optical system includes a reflecting light condenser lens that converges the reflected light from the recording layer, a reflecting plane provided to a minimum spot position of the reflected light from the recording layer out of the reflected light converged by the reflected light condenser lens, a grating which is installed between the reflected light condenser lens and the reflecting plane with the grating including an optical axis and attenuates the quantity of reflected light from an adjacent layer except the corresponding layer or changes a direction of the reflected light, and a photodetector that detects the reflected light;
reflected light reflected by the reflecting plane is detected on the photodetector; and
the grating is provided with grating pitch that prevents positive and negative first-order lights from returning to the reflected light condenser lens.

6. An optical pickup comprising:
a laser beam source;
an irradiating beam focusing optical system that focuses a laser beam from the laser beam source on one recording layer of a multi-layer optical information storage medium; and
a detecting optical system that detects reflected light reflected from the recording layer of the multi-layer optical information storage medium,
wherein:
the detecting optical system includes a reflecting light condenser lens that converges the reflected light from the recording layer, a reflecting plane provided to a minimum spot position of the reflected light from the recording layer out of the reflected light converged by the reflected light condenser lens, a grating which is installed between the reflected light condenser lens and the reflecting plane with the grating including an optical axis and attenuates the quantity of reflected light from an adjacent layer except the corresponding layer or changes a direction of the reflected light, and a photodetector that detects the reflected light;
reflected light reflected by the reflecting plane is detected on the photodetector;
the irradiating light focusing optical system is provided with a function for splitting a laser beam from the laser beam source into a main beam and two subbeams;
the grating is overlapped with at least one of minimum spot positions by the reflected light condenser lens of the reflected light from the adjacent layer; and
the grating is installed with the grating including the optical axis of the reflected light condenser lens and principal rays of the two subbeams.

7. An optical pickup comprising:
a laser beam source;
an irradiating beam focusing optical system that focuses a laser beam from the laser beam source on one recording layer of a multi-layer optical information storage medium; and
a detecting optical system that detects reflected light reflected from the recording layer of the multi-layer optical information storage medium,
wherein:
the detecting optical system includes a reflecting light condenser lens that converges the reflected light from the recording layer, a reflecting plane provided to a minimum spot position of the reflected light from the recording layer out of the reflected light converged by the reflected light condenser lens, a grating which is installed between the reflected light condenser lens and the reflecting plane with the grating including an optical axis and attenuates the quantity of reflected light from an adjacent layer except the corresponding layer or changes a direction of the reflected light, and a photodetector that detects the reflected light;
reflected light reflected by the reflecting plane is detected on the photodetector;
the grating comprises:
a first transparent substrate provided with a grating coated with material that reflects the laser beam or material that absorbs the laser beam on the surface;
a second transparent substrate having the same refractive index as the first transparent substrate and arranged on the side on which the grating is formed of the first transparent substrate; and
a material having the same refractive index as the first and second transparent substrates and filled between the first and second transparent substrates.

8. The optical pickup according to claim 7, wherein:
the surfaces that cross the optical axis of the grating are a plane perpendicular to the optical axis.

9. The optical pickup according to claim 8, wherein:
reflection reducing coating is formed on the surface on the side on which the light is incident out of the surfaces perpendicular to the optical axis of the grating.

10. The optical pickup according to claim 9, wherein:
the surface far from the reflected light condenser lens out of the surfaces perpendicular to the optical axis of the grating functions as the reflecting plane.

* * * * *